Feb. 25, 1930.  V. C. ARMSTRONG  1,748,695
RAIL JOINT
Filed March 25, 1929  2 Sheets-Sheet 1
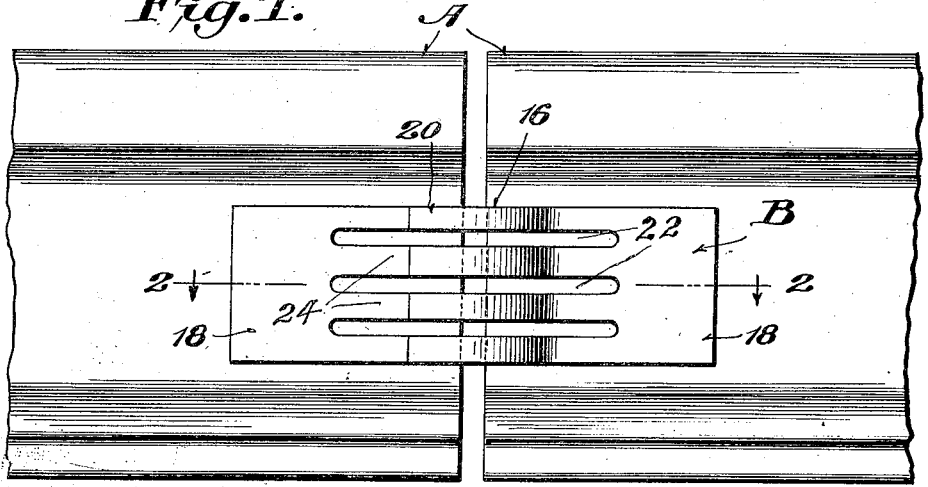
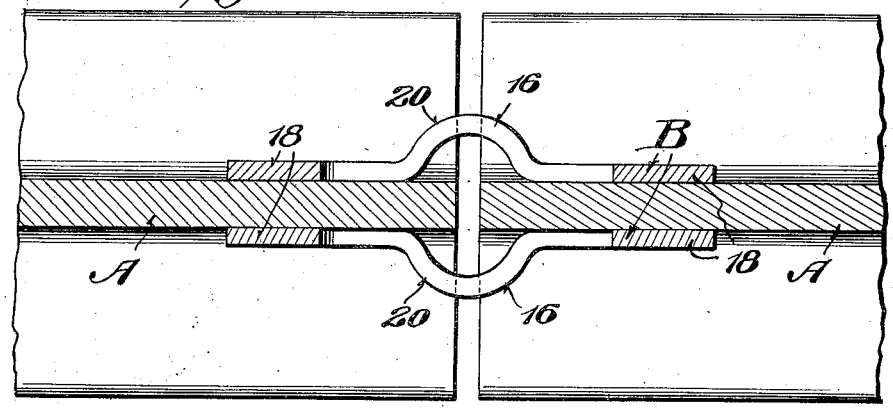
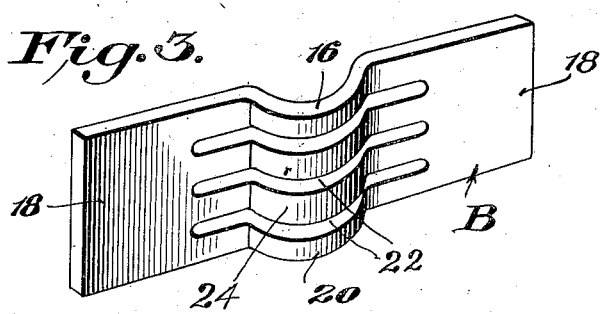
Inventor
Victor C. Armstrong, Feb. 25, 1930.     V. C. ARMSTRONG     1,748,695
RAIL JOINT
Filed March 25, 1929     2 Sheets-Sheet 2
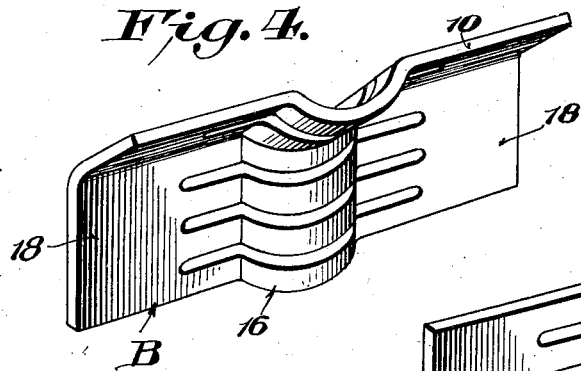
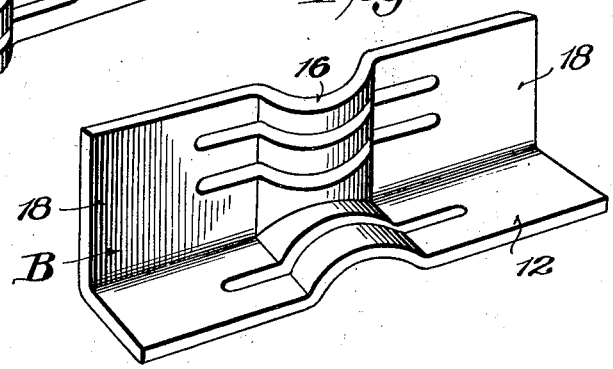
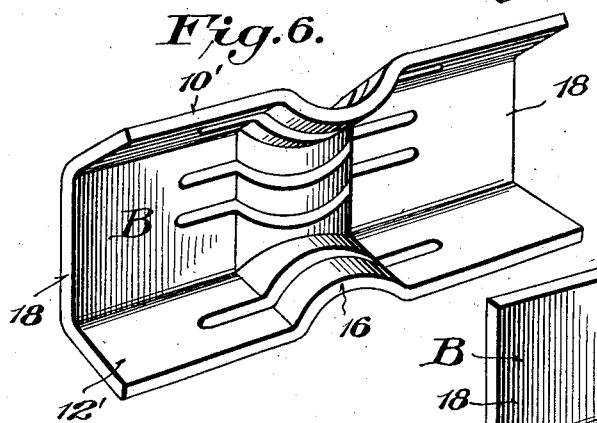
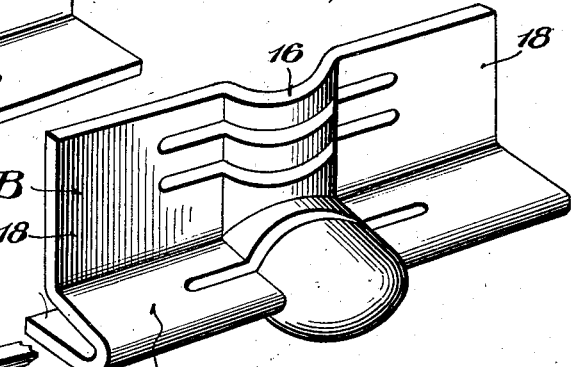
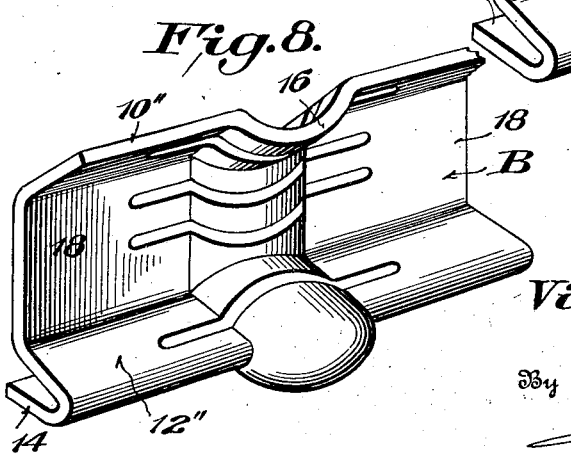
Inventor
Victor C. Armstrong,
By
Attorney Patented Feb. 25, 1930

1,748,695

UNITED STATES PATENT OFFICE

VICTOR C. ARMSTRONG, OF HACKENSACK, NEW JERSEY, ASSIGNOR TO THE RAIL JOINT COMPANY, OF NEW YORK, N. Y., A CORPORATION OF NEW YORK

RAIL JOINT

Application filed March 25, 1929. Serial No. 349,823.

This invention relates to improvements in rail joints and has for one of its objects to provide a joint bar possessed of the necessary strength and rigidity in all directions to effect a strong and durable union between a pair of rails and at the same time possessed of all necessary longitudinal yieldability to permit the rails to expand and contract with changes in temperature conditions.

Another object is to provide a joint bar which is possessed of the foregoing characteristics and which is light in weight, relatively easy and inexpensive to produce and to embody in a rail joint, and which is constructed to absorb considerable of the severe vibration to which rail joints are subjected in use whereby other parts of the joints may be materially relieved of the damaging effects of such vibration.

With the foregoing general purposes in view, the invention resides in the advantageous features of novelty as will be hereinafter more fully described, illustrated in the accompanying drawings and defined in the appended claims.

In the drawings, wherein like characters of reference denote corresponding parts in the different views:

Figure 1 is a side elevation illustrating a pair of rails united by means of one form of the improved joint bar.

Fig. 2 is a horizontal section through the joint illustrated in Fig. 1.

Fig. 3 is a perspective view of one of the joint bars employed in the joint of Figs. 1 and 2.

Fig. 4 is a perspective view of another form of joint bar having the same beneficial characteristics as the joint bar of Fig. 3.

Fig. 5 is a perspective view illustrating another form in which the joint bar may be produced.

Fig. 6 is a perspective view illustrating a combination of the forms of the joint bars shown in Figs. 4 and 5.

Fig. 7 is a perspective view illustrating another form in which the joint bar may be produced; and Fig. 8 is a perspective view illustrating a combination of the forms of joint bars shown in Figs. 4 and 7.

Referring to the drawings in detail, A, designates the meeting end portions of a pair of ordinary service rails and B, a pair of joint bars, which may be of the form shown in either of Figs. 3, 4, 5, 6, 7 and 8, for joining said rails together.

Each bar B, which may be of any suitable or desired length, thickness and cross-sectional shape, as suggested by the respective figures of the drawings, may be secured to the rails in any suitable or desired manner, as, for example, by means of welding, the only essential in this respect, in so far as the present improvements are concerned, being that the rigid connections of said bar with the rails shall not extend entirely to the meeting ends of the latter but shall terminate a short distance spaced from the end of at least one of the rails.

In Figs. 1 to 3 of the drawings the bar B is of such shape as to engage with and be secured to only the web of the rail; in Fig. 4 it is suggested that the bar may be of inverted L-shape in cross-section so as to not only to engage with the web of the rail but also to include portions 10 for engagement with and to be secured to the under face of the head of the rail; in Fig. 5 it is suggested that the bar, otherwise similar to the bar illustrated in Figs. 1 to 3, may be provided with a foot flange portion 12 to overlie and be secured to the rail flange; in Fig. 6 it is suggested that the bar may be inclusive of both a portion 10' similar to the portion 10 of the bar shown in Fig. 4, and a portion 12' similar to the portion 12 of the bar shown in Fig. 5; in Fig. 7 it is suggested that the bar, otherwise similar to the bar shown in Fig. 5, may be provided with base portions 14 extending inwardly from its foot flange portion 12'' to underlie the bottom of the rail; and in Fig. 8 it is suggested that the bar, otherwise similar to the bar illustrated in Fig. 7, may be provided with an upper flange portion 10'' similar to the portion 10, 10' of Figs. 4 and 6 of the drawings.

Irrespective of the cross-sectional shape of the joint bars it is proposed that each bar shall be formed as a single plate and that it shall be extended outwardly into substantially U-shape intermediate its ends, as indicated at 16 in each of the figures of the drawings, whereby the bar will be possessed of the necessary flexibility to enable its end portions, which are adapted to be rigidly secured to the respective rails, to move towards and away from one another thus to permit the rails to expand and contract under changes in temperature conditions. In other words, by reason of the portions 16 being of U or of substantially U-shape, that is, inclusive of leg portions 18, 18 extending outwardly in spaced relation to one another at substantially right angles to the end portions of the joint bar and connected together at their outer ends by the bight portions 20, it is apparent that the bar, considered in its entirety, is rendered quite flexible endwise so that the rail ends may move towards or from one another substantially unhampered by the joint bar despite rigid connections between the ends of the latter and the respective rails. On the other hand, due to the materially greater length than thickness of the respective joint bar portions in cross-section, and due to the substantially right angular relation of the portions 18, 18 with respect to the body or end portions of the joint bar, it is apparent that said bar may be constructed relatively thin and that it still will possess the necessary rigidity and strength to hold the rails against movement out of alinement with one another in all directions. It thus is manifest that the joint bar may be economically constructed of relatively light weight, and to further reduce its weight and increase its endwise yieldability without materially affecting its strength and rigidity laterally, and also to enable same to absorb considerable of the severe vibration to which a rail joint is subjected in use, thus to relieve other parts of the joint of the harmful effects of much of such vibration, said joint bar may, irrespective of its cross-sectional shape, be provided with any desired plurality of longitudinally extending slots or voids 22 crossing the portions 16 and terminating any suitable or desired distance from the ends of the bar, the intermediate portions of the bar thus being composed of a plurality of spaced bar elements 24 connecting the end portions of the joint bar and capable of yielding laterally with respect to one another to impart transverse, vibration absorbing flexibility to the joint bar considered in its entirety.

A joint effected by means of any of the various forms of joint bars herein illustrated, or by other bars equivalent in form to any of the present bars, is exceedingly simple and inexpensive to produce, strong, durable, efficient in use and requires only a minimum amount of welding.

Without further description it is thought that the features and advantages of the invention will be readily apparent to those skilled in the art, and it will of course be understood that changes in the form, proportion and minor details of construction may be resorted to, without departing from the spirit of the invention and scope of the appended claim.

I claim:—

In a rail joint, the rails, and a joint bar adapted to be rigidly secured at its ends to said rails, said bar being inclusive of an outwardly directed substantially U-shaped formation intermediate its ends and being formed from a single piece of sheet metal longitudinally slotted across said U-shaped formation to provide a plurality of longitudinally extending bars terminating a material distance inwardly of the ends of the joint bar.

In testimony whereof I hereunto affix my signature.

VICTOR C. ARMSTRONG.